United States Patent [19]

Storace et al.

[11] Patent Number: 4,831,554

[45] Date of Patent: May 16, 1989

[54] POSTAGE METER MESSAGE PRINTING SYSTEM

[75] Inventors: Anthony Storace, Norwalk; John D. O'Connell, Ridgefield, both of Conn.

[73] Assignee: Pitney Bowes Inc., Stamford, Conn.

[21] Appl. No.: 850,480

[22] Filed: Apr. 10, 1986

[51] Int. Cl.⁴ .............................................. G06F 15/20

[52] U.S. Cl. ................................ 364/519; 364/464.02

[58] Field of Search ................ 235/101; 364/464, 466, 364/464.02, 519

[56] References Cited

U.S. PATENT DOCUMENTS 4,168,533 9/1979 Schwartz ............................ 364/900

*Primary Examiner*—Parshotam S. Lall
*Assistant Examiner*—Edward R. Cosimano
*Attorney, Agent, or Firm*—Michael J. DeSha; David E. Pitchenik; Melvin J. Scolnick

[57] ABSTRACT

An electronic postage meter for printing postage indicia having a postage value and a message, in which the message is stored in a memory and the printer of the postage meter prints the message in accordance with that stored in the memory. The postage meter is provided with a communication port and is responsive to determined signals received at the port for changing the message stored in the memory, thereby to change the message printed in the postage indicia.

20 Claims, 10 Drawing Sheets

REMOTE ACCOUNTING ROUTINE

POSTAGE METER MESSAGE PRINTING SYSTEM

FIELD OF THE APPLICATION

The present invention relates to a postage meter recharging system and more in particular to a postage meter adapted for the selective imprinting of messages.

BACKGROUND OF THE INVENTION

Postage meter devices have found wide application in many businesses. The device prints a standard unit of value for governmental or private carrier delivery of parcels and mail. It is understood that the term "postage meter" also includes other like devices which provide a unit value metering capability.

One disadvantage of the postage meter devices as they are utilized today is the problem of modification of the contents of internal registers, for example recharging the postage meter with funds to be metered. At present, postal regulations required that the funds be prepaid before metering commences. This requirement results in a postage meter being physically taken to a post office facility for recrediting or there being means for obtaining a remote recrediting of the meter device. A further problem resides in the difficulty of changing the message, such as an advertisement, on indicia printed by the postage meter.

Various schemes have been devised and implemented to obtain the desired remote recrediting based on information from a remote accounting station. Typical configurations are shown in U.S. Pat. No. 3,792,446 to McFiggans, et. al. entitled "Remote Postage Meter Resetting Method" and in U.S. Pat. No. 4,097,923 to Eckert, Jr., et. al. entitled "Postage Meter Charging System Using an Advanced Microcomputerized Postage Meter." These patents teach a data center which is equipped with a programmed digital computer and a voice answer-back unit to process telephone calls from users of postage meters equipped either with a combination lock such that the lock prohibits recharging of the associated meter until it is unlocked or, in the case of U.S. Pat. No. 4,097,923, of a working memory which contains a seed number for generating postage funding combinations to unlock the meter. The remote system of the latter patent includes the capability of adding variable amounts of postage to the postage meter. The teaching of U.S. Pat. No. 3,792,446 relate only to the addition of a fixed increment to the meter.

U.S. Pat. No. 3,255,439 to Simjian discloses a system in which the meter communicates directly to a central accounting station for accounting for each and all of the metering operations either on a real time basis or in batches. Similar systems are disclosed for instance in West German patent application No. DE 2636852 published Feb. 23, 1978 in which a data transmitting unit is employed to recharge the postage meter by way of telephone or telegraph lines. U.K. application No. 2,147,852 published May 22, 1985 further discloses a telephone integrated with a mail franking device which will operate as either a telephone or a postage meter. The telephone key pad may used to set postal values and it is disclosed that the accounting may be done either in the device or in a central accounting unit.

Each of the devices is limited in that there are required a number of complex operations in order for the user of the postage meter to assure that there are funds in the meter to be dispensed. In every case in the known postage meters, where the meter funds are required to be updated, it is up to the user to realize that the funds in the meter are low and that the user should initiate a telephone call or take the meter to the Post Office in order to recredit the meter. In many cases, a low funds event may occur as the user is in the midst of a mailing run. Because the prior art devices typically have a lockout feature to prevent meter operation when the funds get too low, the user is unable to continue with postage metering operations. In such cases, the user experiences dissatisfaction because one of the reasons for utilizing the remote recharging features of the postage meter is to eliminate the problem of having to go to the Post Office and to be able to obtain postage as needed.

As discussed above, a further problem in the provision of known postage meters has been the difficulty of changing messages, such as advertisements, to be printed with the postage meter indicia. In conventional postage meters, the message generally is prepared on a fixed stamp that cannot be altered by a user. While various attempts have been made to enable user modification of the messages, such solutions result in increasing complexity of the mechanical printing arrangement, or reduction of the security of the postage.

SUMMARY OF THE INVENTION

The present invention is therefore directed to the provision of a postage meter adapted to be connected to a communication path, for example, a communication path adapted to enable recharging of the postage meter, so that a user may communicate directly with a data center to request a modification of the message printed by a postage meter at the user's location. Thus, the invention may be incorporated in a system such as disclosed in copending patent application, Ser. No. 850,479 entitled "Postage Meter Recharging System", wherein a postage meter monitors the funds remaining in its descending register and whenever the value reaches a predetermined level, an automatic dialing device establishes communication to initiate a funds transfer. An account corresponding to the postage meter is maintained at a remote accounting data center such as a bank. Once communication to the remote accounting center is established, the account of the postage meter user is verified to assure that sufficient funds are available for transfer to the postage meter. In the event that the account is verified as proper, a signal, preferably recrediting data encrypted to prevent fraud, is transmitted to the postage meter to update the credit register. Preferably, the predetermined threshold is selectable by the user to match his expected use of postage. For best results, the meter stores the signal indicating the necessity for recrediting of the register and communicates during an offpeak period such as nighttime when the cost of telephone communications are lower and when the data center can be expected to encounter much less demand on its facilities. The calls from various postage meters may be staggered in order to avoid overloading the system. To ensure the integrity of the recharging operation, provision is made upon calling the data center to ascertain the identity of the calling meter location and then to break the connection and for the data center to immediately redial the location. Upon connection the meter at the called location is polled for identification and the responding code compared with the prestored identity of the meter at such location. In response to verification, the meter funding register is then activated as described above. These verification operations take place in a manner requiring no user intervention and thus are completely transparent to the user.

Preferably, the communications are established through a telephone exchange utilizing dual tone multi-frequency generators and receivers for decoding the data communicated between the meter and remote accounting center. It will be understood that conventional communication through MODEM connections are also contemplated. For best results, the data is encrypted in both directions in order to block fraudulent attempts to recredit the register.

In order to modify the message, such as an ad or the like, to be printed with the postage indicia, the postage meter may have a memory with a message to be printed stored therein, the postage meter having a postage indicia printer such as a dot matrix printer coupled to the memory for printing the indicia at least in part from information stored in the memory. The communication link with the data center enables the data center to modify the data stored in the message memory, to thereby enable the data center, upon request of the user, to control and modify the message that is printed. This feature in accordance with the invention enables, for example, the user to adapt its postage meters to advertising purposes, in accordance with the users need.

It is therefore an object of this invention to provide a postage meter system apparatus and method enabling the economical and efficient modification of the messages printed by the postage meter, without sacrificing any security of the postage meter.

DESCRIPTION OF THE DRAWINGS

In order that the invention will be more clearly understood, it will now be disclosed in greater detail with reference to the accompanying drawings wherein.

DESCRIPTION OF THE PREFERRED EMBODIMENT

Figure 1:
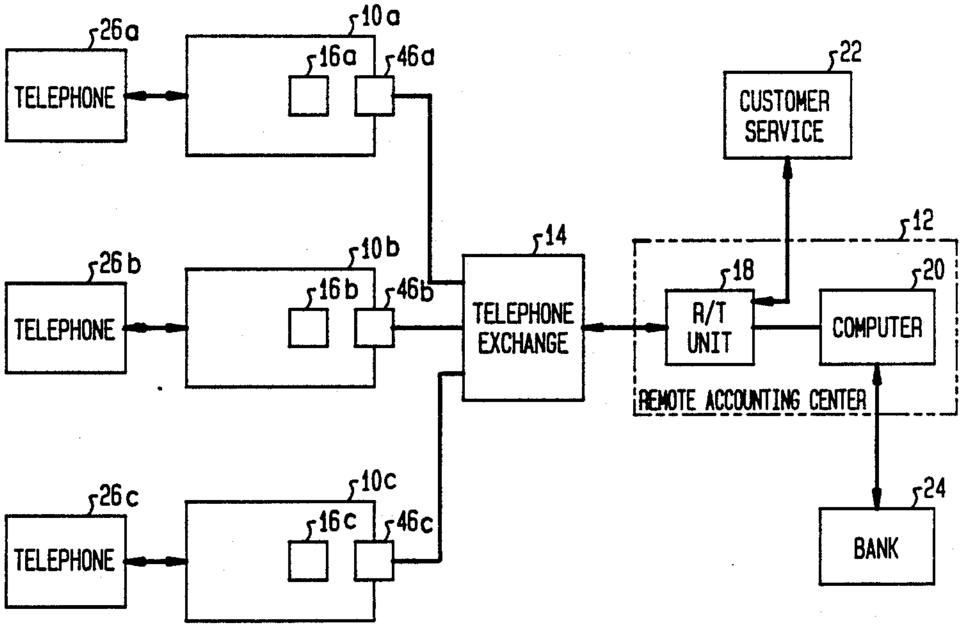
FIG. 1 is a block diagram of a postage meter recharging system.

Referring now to FIG. 1, a schematic block diagram of a remote meter funding system that may be employed in combination with the invention is shown. A plurality of blocks (10*a*, 10*b*, 10*c*) represent postage meter stations capable of communicating with a data center or remote accounting station represented by block 12. The postage meter stations communicate with remote accounting center 12 via telephone exchange equipment generally illustrated by block 14. The transmitter-receiver (16*a*, 16*b*, 16*c*) at each station (10*a*, 10*b*, 10*c*) is preferably a DTMF generator-receiver combination such as for example, Motorola MC 14410 DTMF Generator and GTE G8870A DTMF Receiver connected to output port (46*a*, 46*b*, 46*c*)

Data center 12 includes a similar generator-receiver shown at 18. This generator-receiver 18 will receive frequency encoded data input from the transmitter-receiver combination (16*a*, 16*b*, 16*c*) at any of the stations (10*a*, 10*b*, 10*c*) and transform this input into a suitable, machine language for a programmed or special purpose digital computer 20. The computer 20 may be, for example, a Data General "Nova". The computer in turn communicates back to the particular postage meter station (10*a*, 10*b*, 10*c*) via the communication line established, by the telephone exchange equipment. It will appreciated that communication between each postage meter station and the remote accounting center could be by way of a MODEM as is well known in the art of computer communication.

The data center 12 is shown in conjunction with a customer service facility 22 for providing human communication, if required, to the user of the postage meter station (10*a*, 10*b*, 10*c*) in order to provide help or information. In one embodiment of the charging system in accordance with the invention, the data center 12 may be in communication with a remote banking facility 24 to provide a funds transfer between an account maintained at the banking facility 24 and the remote accounting center 12. Typically, the postal meter station (10*a*, 10*b*, 10*c*) will be used in conjunction with a conventional telephone handset (26*a*, 26*b*, 10*c*) coupled thereto.

Figure 2:
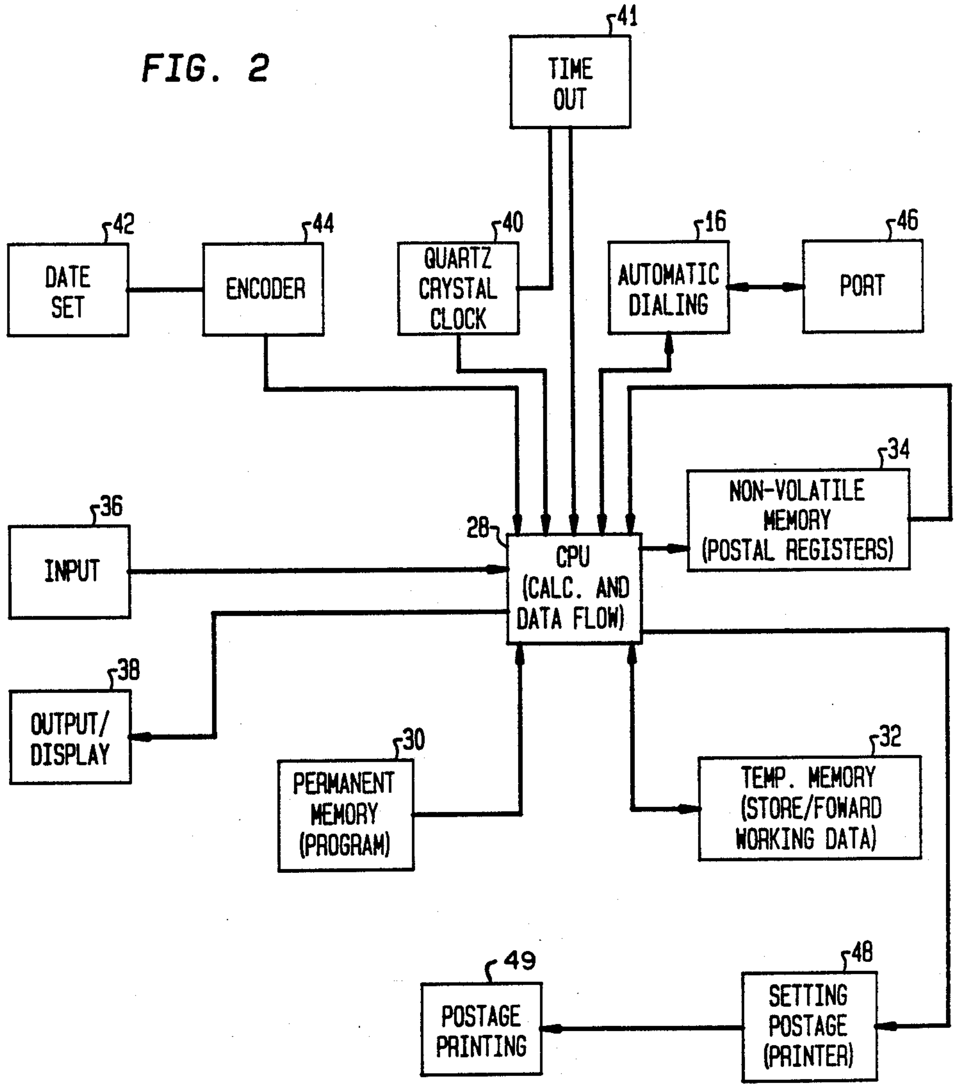
FIG. 2 is a block diagram of a postage meter.

Referring now to FIG. 2, the general functional arrangement of the computerized postage meter station (10*a*, 10*b*, 10*c*) of the present invention is illustrated.

Electronic postage meters are known and are described, for instance, in U.S. Pat. No. 3,978,457 for Microcomputerized Electronic Postage Meter System and in U.S. Pat. No. 4,301,507 for Electronic Postage Meter Having Plural Computing Systems, the disclosures of which are specifically incorporated by reference herein.

The heart of the system is the CPU or microprocessor 28 and it performs two basic functions: performance of calculations based on input data and controlling the flow of data between various memory units. Three basic memory units are employed with the CPU 28. The first is the ROM or permanent memory 30 which as is well known is a non-alterable memory storing the specific sequence of operations for performing postal data calculations in accordance with certain predetermined inputs as well as performing other routines for operating the system. The second memory unit is a temporary memory, RAM 32 which interacts with the CPU 28 for forming a temporary storage, holding and forwarding working data in accordance with the calculations being performed by the CPU 28. An additional memory component, NVM 34 which may be a battery backed RAM or other memory capable of long term storage of data is also coupled to the CPU 28. It will be understood that the data calculation may be performed and stored in battery backed RAM or an appropriate NVM of other known types. The NVM 34 is a non-volatile memory which acts to store certain critical information employed in the postal system. Information stored in the temporary memory 32 which represents crucial accounting functions such as descending balances in a descending register or ascending credits in an ascending register and the like are stored in the nonvolatile memory 34 wherein they may be held while the machine is deenergized and then recalled upon a subsequent start-up. In this manner, the computer system may continually act upon these balances in the temporary memory 32 without fear of loss of this information upon shutdown.

Further, the information may be recalled on reactivation by start-up by retrieving it from the nonvolatile memory 34. The nonvolatile memory is shown as coupled to the CPU and deriving an output therefrom in accordance with the transfer of information from the temporary storage 32 under the control of the permanent memory 30 through the CPU 28. The nonvolatile memory 34 is also shown as providing an output line coupled back into the CPU 28 for transferring the data back into and through the CPU 28 and into the temporary memory 32 in accordance with the start-up routine under the control of the permanent memory 30.

The system operates in accordance with data applied from an appropriate input means 36. It will appreciated that the input means may include mechanical print value setting devices and switches in place of or in addition to a keypad. This data is fed into the CPU 28 under control of the program in the permanent memory 30. At any time during the operation of the system, the contents of the temporary memory 32 storing the appropriate credit, debit, balances, or other accumulations in accordance with the various features of the system could be made available by an appropriate instruction provided by the input means 36 or communicated to the meter. This causes the CPU 28 to access the desired location in temporary memory 32, thereby storing the information requested. The information may also be provided through the CPU 28 into the output display unit 38.

Further there is shown a clock 40 connected to the CPU for the purpose of providing time and date information to the CPU. Such clocks are well known and may comprise for instance an LSI logic circuit in combination with a quartz-crystal controlled oscillator. In connection therewith, there is provided a timeout device 41 coupled to the clock 40 and the CPU 28. The timeout device operates to measure the time during which the meter is without power. Since the meter of the present invention is designed to be operative only at one specific location, it is assumed that an inordinate time without power may be indicative of an attempt to change the location of the meter. The use of the timeout signal will be explained further below. The dater wheels indicated at 42, which are typically positioned manually, have encoders 44 coupled thereto which provide date wheel positioning information to the CPU. A suitable arrangement is shown for example in U.S. Pat. No. 4,060,720 to Check specifically incorporated by reference herein.

Under control of the CPU, when appropriate postal data information is provided, the postage setting device 48 will enable postage printing device 49. Details of suitable apparatus are described for instance in U.S. Pat. No. 3,978,457 previously incorporated by reference.

As previously described with respect to FIG. 1, a DTMF Transmitter and Receiver combination 16 is coupled to the CPU and to an output port 46 for establishing communication and for communications between the remote accounting center and the CPU under the control of the CPU or the remote accounting center.

Figure 3:
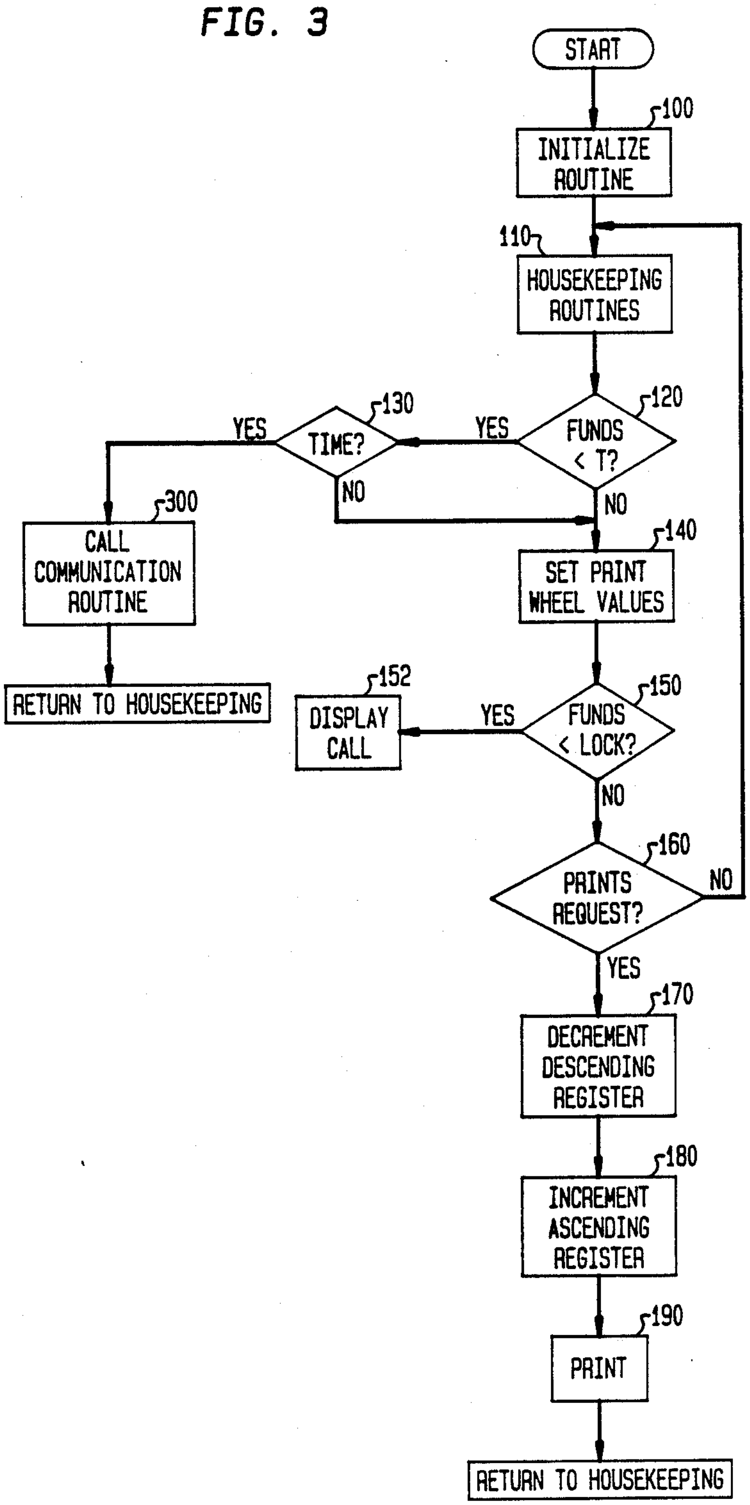
FIG. 3 is a flow chart of the operation of the postage meter.

FIG. 3 illustrates in a flow chart the operation of a postage meter. Once the postage meter station 10 is installed, the meter program proceeds through its initializing routines shown at block 100. Thereafter as described more fully below the meter will continuously loop through its routines to check meter parameters and input conditions and to print postage as desired by the user.

As shown in block 110 the meter program proceeds through housekeeping routines such as those described for instance in U.S. Pat. No. 4,301,507 previously incorporated by reference for monitoring various meter conditions. The routine then proceeds to decision block 120 to check whether the funds in the descending register have been decremented to a predetermined threshold level. Preferably this threshold level is set in accordance with the user's desires. This may be accomplished either through preset values in the program stored in ROM or through communication between the installed meter and the remote accounting center.

Figure 4:
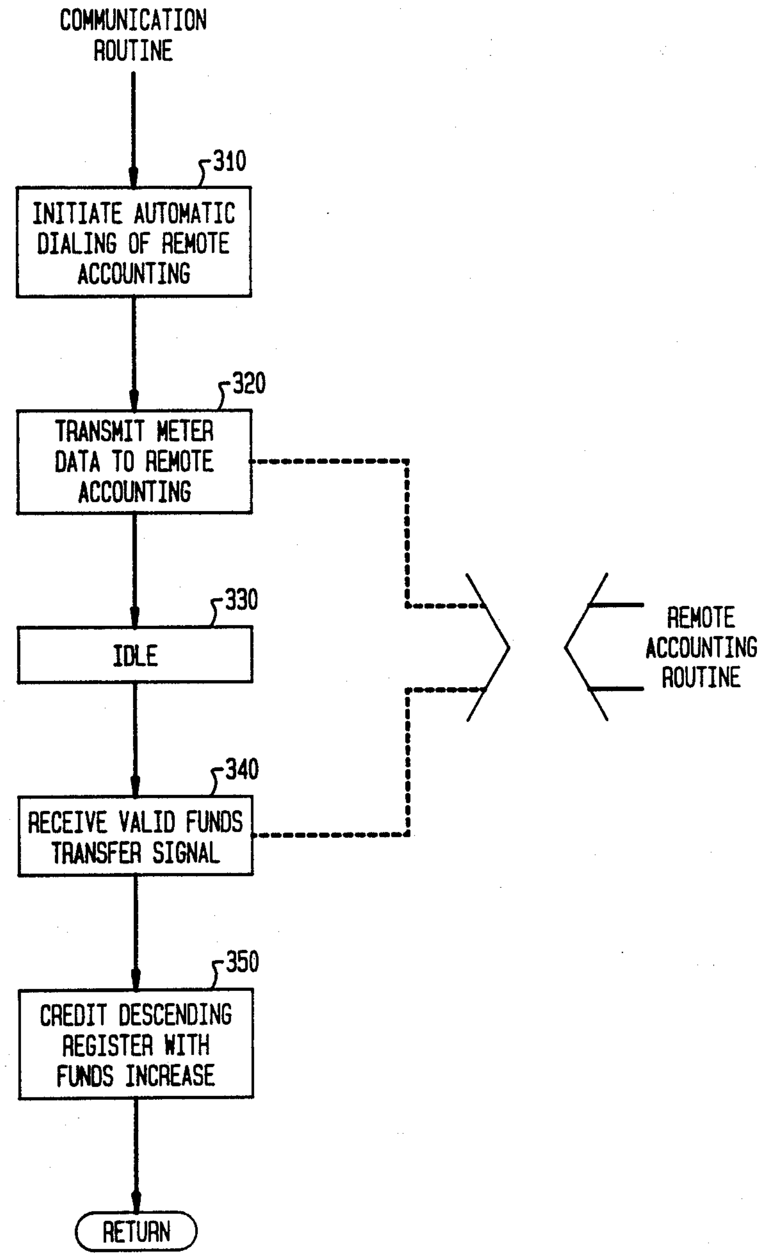
FIG. 4 is a flow chart of a communication routine for establishing communication between the postage meter and the remote accounting center.

If the threshold value has been reached, the routine proceeds to decision block 130 to determine if a predetermined time has been reached. If the time is appropriate, the communication routine shown as block 300 and described in conjunction with FIG. 4 is called and communication is established at port 46 through the telephone exchange to the remote accounting center 12. It will be appreciated that it is preferable that the calls which may be made to the remote accounting center be staggered in order that the center be able to accommodate the various postage meter stations. Accordingly the predetermined intervals may preset in the permanent program memory or may be downloaded to the postage meter station at the initial communication between the postage meter and the remote accounting center.

If however the threshold value has not been reached or the threshold was reached and funds have been recredited to the meter, block 120, or if the predetermined time has not been reached, block 130, the program proceeds to block 140 which is a routine to set print wheel value (in conjunction with block 48, FIG. 2). Typically the print wheels will remain set at the previously selected value since the majority of letters will probably not weigh more than that requiring the minimum postage. Known electronic postage meters conventionally use stepping motors for the purpose of setting the print wheels to a value commanded from a keyboard. The block 140 will also be understood to encompass the manual selection of printwheel positions through mechanical coupling between the setting means and the print wheels and the verification of each print wheel position.

At decision block 150 the value stored in the descending register is compared to a meter lockout value to determine for instance whether there are funds available for metering even though the predetermined recrediting threshold has been reached. If the meter lockout point has been reached the program branches to block 152 to display a message to the user, for example, "Call Customer Assistance" or the like. When funds remain, the program decision block 160 checks to see if a postage printing has been commanded. If no printing has been initiated, the program loops back housekeeping, block 110. If a print cycle has been requested, the descending register is decremented and the ascending register is incremented as illustrated in blocks 170 and 180. The program moved to block 190 where the printer prints the selected postal value and the program returns to block 110.

FIG. 4 is a flow chart of a communication routine called by the postage meter program in the event that funds in the descending register have been decremented to the previously set threshold value. The routine 310 signals the DTMF transmitter-receiver 16 to dial the preselected telephone number of the remote accounting center 12 and establishes communication between the postage meter and the remote accounting center. It will be understood that various "handshaking" procedures are well known and may be utilized for establishing valid communication. Suitable protocols are described in U.S. Pat. No. 3,253,158 specifically incorporated herein by reference and in previously cited U.S. Pat. No. 4,097,923. As shown in block 320 the program falls to a transmit meter data information block. It will be appreciated by those skilled in the art that all of the required meter data can be transmitted to the remote accounting center in a group of tone signals or the information may be transmitted piecemeal in response to queries from the computer in the remote accounting center.

The program then remains in an idle loop 330 until the register recrediting data is received on block 340. For best results the recrediting information transmitted by the remote accounting center to the postage meter must be encrypted to prevent fraudulent register updates being sent to the meter by unscrupulous partles. Accordingly, the block 340 also includes a routine for decrypting data that has been encrypted by the computer in the remote accounting center for transmission to the particular individual postage meter. A suitable encryption scheme is described for example in U.S. Pat. No. 3,792,446 specifically incorporated herein by reference.

Upon assuring that the meter has received proper and authentic register recrediting information from the remote accounting center, the program performs the update of the descending register at block 350 and returns to the main program illustrated in FIG. 3.

Figure 5:
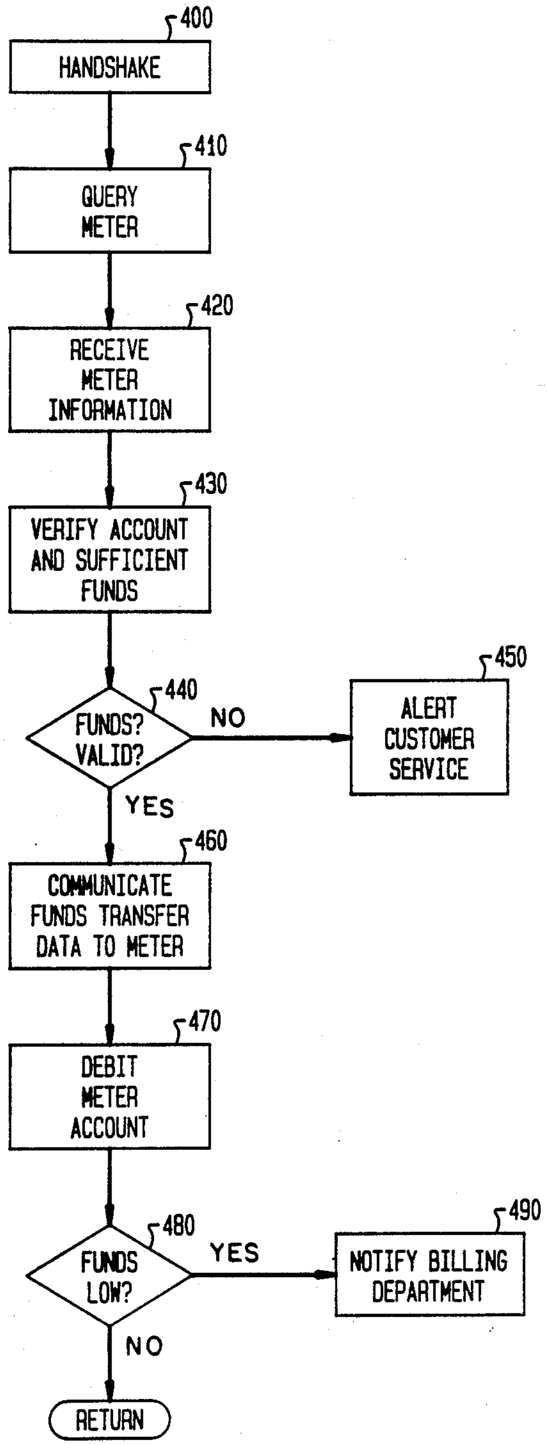
FIG. 5 is a flow chart of the operation of the equipment at the remote accounting or data center.

FIG. 5 is a flow chart illustrating the sequence of operations carried on at the remote accounting center upon communication being established between the postage meter and the accounting center. The instant routine is initiated by a telephone connection being established between the postage meter and the remote accounting center. As described previously in connection with FIG. 4, the counterpart "handshake" is achieved in block 400. Once the communication is established, the program falls to block 410 to request the meter to transmit meter data to the computer. The data to be transmitted includes at least the meter I.D. number and the values in the descending and ascending registers in the meter, and is received, block 420.

The computer then proceeds to verify that the account is valid and that sufficient funds are available, block 430, and decision block 440. If funds are not available the program branches to block 450 to alert customer service that there are no funds for transfer to this particular meter. Assuming that there are sufficient funds, register update information, preferable encrypted as described above, is transmitted to the meter via the telephone connection, block 460. The user's account is debited, block 470, and if the funds available have reached a predetermined threshold level, decision block 480, customer billing is notified, block 490. If funds have not dropped to a predetermined level, the routine proceeds to "Return" and awaits initiation again.

Figure 6:
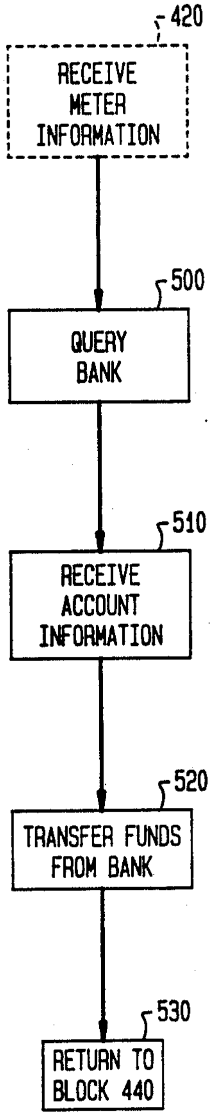
FIG. 6 is a flow chart of an alternate method of operation.

FIG. 6 shows an alternative method for maintaining the user's account. In accordance with this method the user's funds are maintained in a fund in a bank. Whenever the postage meter is to be recredited, the user's account is verified and the postage meter recrediting information is transmitted. The bank is then queried, block 500, and account information exchanged, block 510. The funds to cover the recrediting are transferred from the bank to the remote accounting center, block 520. The routine then proceeds to block 530 where the routine returns to block 440. The advantage of this arrangement is that the user's funds can be drawing interest instead of being tied-up in the account for directly funding the meter.

Figure 7:
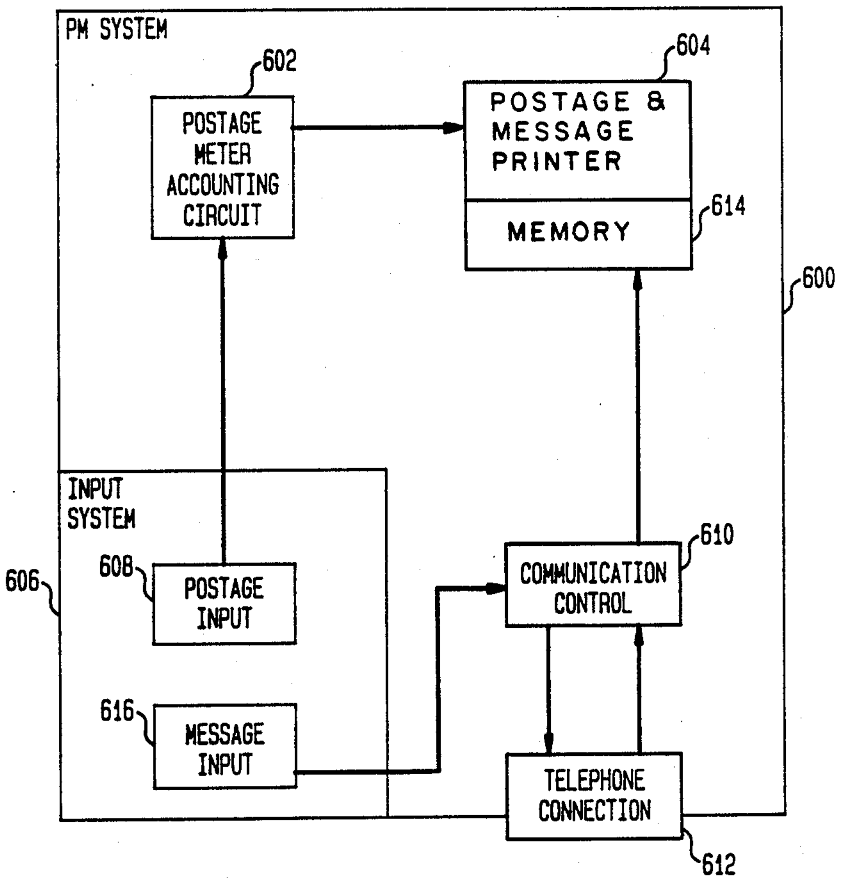
FIG. 7 is a block diagram of one embodiment of a remote postage meter system incorporating a postage meter and enabling modification of a message printed thereby.

One remote postage meter system enabling modification of a message to be printed with postage indicia, in accordance with the invention, is illustrated in FIG. 7. In this arrangement, the postage meter system 600 comprises a postage meter accounting circuit 602 coupled to control a postage printer 604, and an input system 606 having a postage input device 608, such as a keyboard for entering the value of postage to be printed, the postage input 608 being coupled to the postage meter accounting circuit 602 in accordance with conventional practice. The system further includes a communication control system 610 which may incorporate the communication control arrangement above-described for communicating with a data center, the communication control system 610 being coupled to a telephone connection 612 enabling communication with a data center, for example, for recharging or the like.

The postage and message printer 604 is provided with a memory 614 having a message stored therein, the postage and message printer 604 being of the type to print a message in accordance with the stored data. For example, the printer may comprise a dot matrix printer, arranged, for example, in the manner disclosed in U.S. Pat. No. 4,637,051 entitled System Having a Character Generator for Printing Encrypted Messages and assigned to the present assignee. It is of course apparent that other printing arrangements adapted to print an indicia at least in part on the basis of data stored in the memory may be employed, within the scope of this invention.

The postage meter system of FIG. 7, further incorporates a message input device 616 in the input system 606, the message input 616 being coupled to the communication control 610 to direct the application of a request to the data center by way of the telephone connection 612 and a communication path such as convention telephone lines, to have the message printed by the postage and message printer 604 of the postage meter system to be changed. The message input may comprise a keyboard or any other input device for receiving information directing the communication control 610 to dial the data center, and including a request for modification of the message. The request as sent by the communication control may be coded in accordance with conventional practice, including data relating to the postage meter system itself, so that the request may be verified by the data center. The message input 616 may be of the type enabling the user to directly input a message, for example, by way of a keyboard, or, if desired, to select a message of a plurality of messages stored at the data center. The invention is not directed to any specific technique for this purpose. Alternatively, of course, in accordance with the invention, the user may call the data center by a conventional oral communication device, for example, external of the postage meter, and upon proper verification, to request the data change orally from the data center. The broad concept of the invention hence is not limited to any specific manner for requesting the data center to modify the message. It is of course apparent that in certain circumstances it may also be desirable for the request for change of message to be originated at the data center itself.

Figure 8:
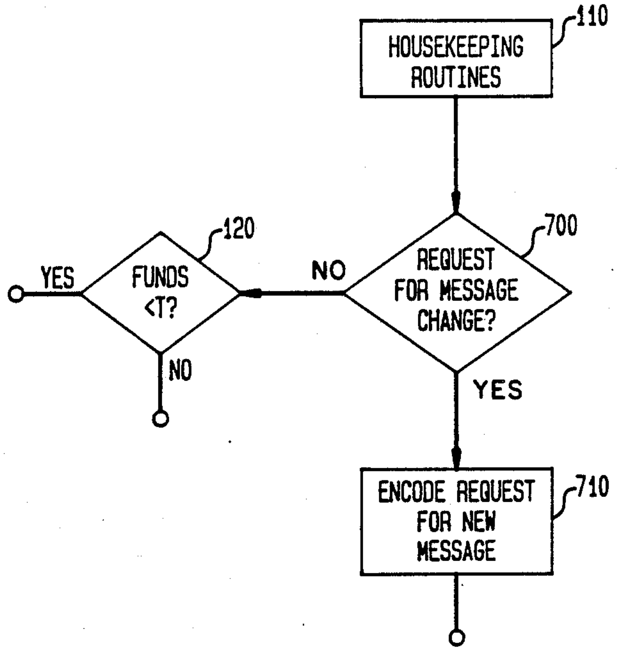
FIG. 8 is a modification of a portion of the flow diagram of FIG. 3 illustrating one technique for initiating a request for a message change.

As illustrated in FIG. 8, the postage meter routines may be modified to incorporate a test for a request for a message change at block 700, and to encode the request for application to the telephone connection, at block 710. The postage meter may include a further routine responsive to receipt of the new message from the data center for verifying the new message and applying it to the memory 614 of FIG. 7. If there is no request for a message change at decision block 700, the program branches to block 120 of FIG. 3 to continue the normal postage meter routine.

Figure 9:
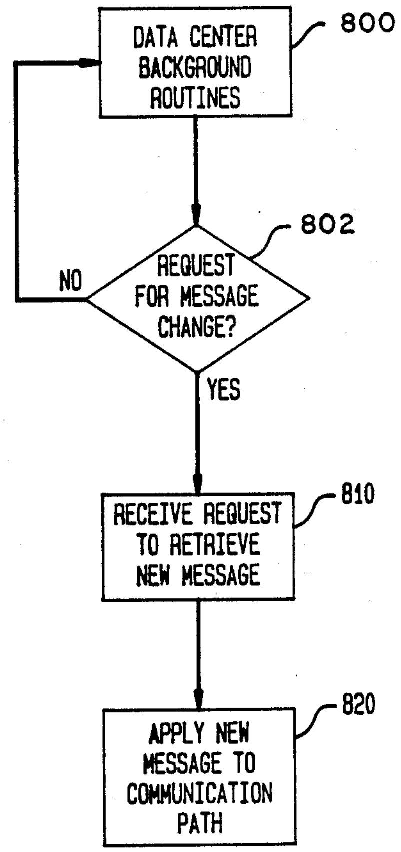
FIG. 9 is a simplified flow diagram of a data or accounting center enabling mofidication of the message printed by the postage meter.

The data center, as illustrated in FIG. 9, performs background routines at block 800 and tests incoming messages for requests for message changes at block 802, and in response to the receipt of the request at block 810 applies the new message to the communication path at block 820. These steps may all incorporate procedures for verification, coding and decoding, in accordance with the conventional practice, in order to ensure that the messages are authorized and that the data is correct. It is If no request is received, the routine reverts to block 800. of course apparent that the subroutines illustrated in FIGS. 8 and 9 are exemplary only, and that the invention is not limited specifically to such subroutines.

In another embodiment of the invention, the data center may provide a service to third-party advertisers or other sources independent from the user of the meter who may wish to take advantage of a particular user's mailing list to target a particular group of customers for its own products or services by utilizing the meter message space. In accordance with this aspect of the invention, the user could be offered a significant postage discount for the use of the third party advertising on his mail. By way of example and not as a limitation, advertisements by a credit card company could be applied to mailings of any participating bank, retail establishment, restaurant, hotel, and the like. Airlines may wish to advertise on mail sent out by travel agencies or by car rental companies.

In such event, the data center would not necessarily await the request of the user to have the advertising message changed as described in the flow chart of FIG. 9. Once a willing meter user has agreed to the cooperative advertising arrangement, the data center may proceed directly to establish communication with the meter and apply the third party's desired message to the communication path as shown in block 820 of FIG. 9. It will be appreciated that while this change is sufficient to cause the meter to print the desired message, the advertiser may rightly want some guarantee that his message is actually being utilized by the mailer.

Figure 10:
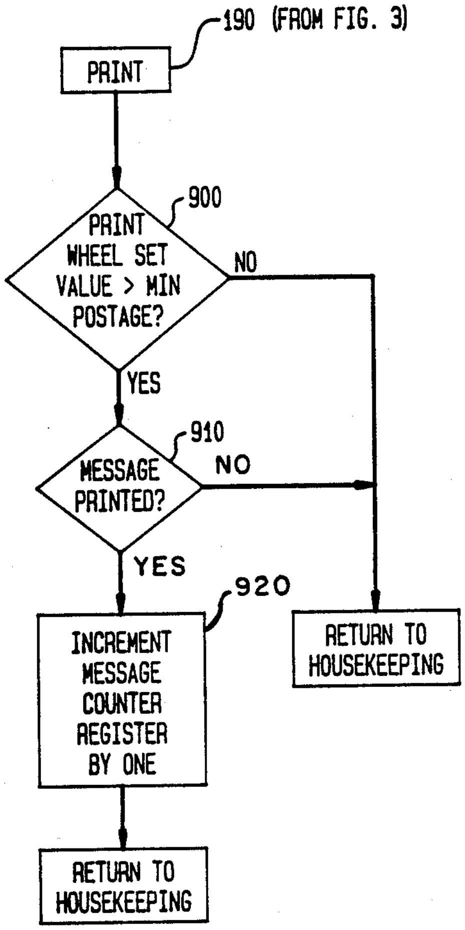
FIG. 10 is a flow chart for the use of third party slogan.

A method for accounting for the actual use of the third party slogan is shown in the flow chart of FIG. 10. The Philosophy of the method is to provide a count in non- volatile memory of only those printing cycles where the print wheel setting is above a predetermined minimum value and the message is being printed. The count is accessible to the data center during the communication routine by querying the meter.

More specifically, as shown in FIG. 10 after the print routine is called in block 190 (from FIG. 3) the program falls to decision block 900 to check the value of postage which was printed at block 190. If the value was less than some predetermined value, e.g. the minimum bulk rate postage, the meter returns to the housekeeping routine as described in conjunction with FIG. 3 without counting the printing cycle. If the value printed was above the predetermined value the meter then checks in decision block 910 to determine whether the message was printed. If the message has been printed, a counter register is incremented by one and the program returns to housekeeping. If the message has not been printed, the routine proceeds directly to return to housekeeping.

It will be understood that the method described in conjunction with the apparatus disclosed herein may also be implemented in other known meters. For instance, the ad slogan or message may be an ad "slug" or "die" installed in a print drum of a meter such as the 5300 series postage meter of Pitney Bowes Inc., Stamford, Ct. The meter is preferably one of the meters in which the die cannot be "ducked", that is it must always be printed when value is metered. The meter setting mechanism must be prevented from setting any values lower than some minimum predetermined value as described above. Various methods and apparatus for achieving this result will occur to those skilled in the art. For example, the lever for setting the "tens" printwheel may be mechanically prevented from setting a zero. In electronic postage meters which set the printwheels by command from a keyboard, the software routine for meter operation can test for minimum value before incrementing a counting register as described above. In the case of the mechanical meter, a mechanical counter will simply count the number of revolutions of the meter drum or any other indication that a print cycle has occurred.

Returning now to FIG. 5, it will be appreciated that the blocks 410 and 420 can include the steps of querying the meter and receiving the count of the printing cycles stored in the counting register of the non-volatile memory. The count may also be obtained of course by inspection of the meter. Discounts in the billing of the postage meter user can then be based on the number of advertisements or messages printed. The third party advertiser may also be billed in accordance with the number of messages printed.

This application incorporates certain material common to certain other applications. The subject matter of all of these applications is incorporated herein by reference. The applications, including the present case, are identified as follows: U.S. Ser. Nos. 850,479; 850,478; 850,477; 850,480 and 850,476.

While the invention has been disclosed and described with reference to a limited number of embodiments, it will be apparent that variations and modifications may be made therein, and it is therefore intended in the following claims to cover each such variation and modification as falls within the true spirit and scope of the invention.

What is claimed is:

1. An electronic postage meter comprising a communication port for accessing a communication path, printer means for printing indicia including a postage value and a message, communication control means coupled to said communication port, said control means comprising nonvolatile memory means for storing data corresponding to said message of said indicia, means coupling said nonvolatile memory and said printer means for communicating said message to said printing means and means responsive to the receipt of predetermined coded signals at said port for modifying said data stored in said non-volatile memory means, whereby the message printed by said postage meter may be selectively changed by receipt of said coded signals at said port.

2. The electronic postage meter of claim 1 wherein said means responsive to the receipt of coded signals comprises means for modifying said stored data as a function of said received coded signals.

3. The electronic postage meter of claim 2 wherein said printer means comprises a dot matrix printer coupled to print a message in alphanumeric characters corresponding to data stored in said memory means.

4. In an electronic postage meter having an accounting circuit including a descending register for storing accounting data corresponding to the total value of postage which said meter is authorized to print, printer means for printing indicia including a postage value and a message, the improvement comprising: a communication port for accessing a telephonic communication path, communication control means coupled to said accounting circuit for applying dialling signals and coded identification signals to said communication port, said dialling signals corresponding to a data enter and said identification signals including data identifying said meter and data corresponding to aid accounting data, said control means comprising means responsive to the receipt of first determined coded signals at said port for modifying the contents of said register to increase the postage which said meter is authorized to print; said control means including nonvolatile memory means coupled to port and said printer means for storing data corresponding to a message, and second means coupled between said port and said nonvolatile memory, said second means being responsive to second determined coded signals at said port for modifying said data stored in said memory means, said printing means being connected to print a message in accordance with said stored data message.

5. A postage meter system comprising a remote station including a postage meter, a data center and a communication path for coupling said remote station and data center, said postage meter comprising a nonvolatile memory, a printer coupled to said nonvolatile memory for printing postage indicia including a postage value and a message corresponding to determined data stored in said nonvolatile memory, and communication control means coupled to said nonvolatile memory and said communication path and responsive to determined signals received from said communication path for modifying said determined data in said memory, said data center comprising means for applying said determined signals to said communication path.

6. The postage meter system of claim 5 wherein said remote station further comprises means for directing signals to said communication path for requesting a modification of said message, and said means of said data center for applying said determined signals to said communication path comprises means responsive to the receipt of said signals directed to said communication path for applying said determined signals to said communication path.

7. The postage meter system of claim 6 wherein said signal directing means comprises means for directing signals to said communication path corresponding to the message desired to be printed by said printer, and said means of said data center for applying said determined signals comprises means for applying signals to said communication path corresponding to said message.

8. A method for changing a message to be printed by an electronic postage meter having a communication port for accessing a communication path, printer means for printing indicia including a postage value and a message, communication control means coupled to said communication port, said control means comprising nonvolatile memory means for storing data corresponding to a message, said method comprising applying predetermined coded signals to said port for modifying said data stored in said memory means, and controlling said printer means to print said indicia with a message corresponding to said stored data message, whereby the message printed by said postage meter may be selectively changed.

9. The method of claim 8 wherein the stored data message is selected by a user of the postage meter.

10. The method of claim 8 further comprising the steps of obtaining said message to be stored from a source independent from a user of said postage meter and coding said message for applying to said port.

11. The method of claim 8 wherein said communication path is connected to a data center, wherein said step of applying predetermined coded signals to said port comprises deriving said predetermined coded signals at said data center and applying them to said communication path for application to said port.

12. The method of claim 11 wherein said step of deriving comprises signalling said data center to derive said predetermined coded signals by applying request signals to said communication path, and responding thereto at said data center by deriving said predetermined coded signals.

13. A method for printing messages utilizing a postage meter comprising the steps of obtaining a message from a source other than a user of the postage meter, incorporating said message for printing in conjunction with the printing of postage meter indicia, counting the number of printing cycles which include the printing of said message in conjunction with the printing of postal value above a predetermined value, and discounting the costs of funding the meter in accordance with the number of printing cycles which include the printing of said message

14. In a postage meter comprising first input means for receiving a value of postage to be printed and printer means for printing postage indicia including data corresponding to said value and a message; the improvement wherein said postage meter comprises memory means for storing data corresponding to a message, and means responsive to said data stored in said memory means for printing said message corresponding thereto, said postage meter further comprising means for modifying said data stored in aid memory means.

15. The postage meter of claim 14 wherein said means for modifying said data comprises second input means on said postage meter for receiving data corresponding to a message to be printed, and means applying data received on said second input means to said memory means for modifying data stored therein.

16. The postage meter of claim 15 wherein said second input means comprises a communications port.

17. In a postage meter comprising input means for receiving a value of postage to be printed and printer means for printing postage indicia including data corresponding to said value and a message; the improvement wherein said printer means comprises means for producing signal corresponding to a message to be printed and a printer device responsive to said signals for printing a corresponding message, said postage meter further comprising means responsive to signals supplied to said postage meter from a source separate from said postage meter for altering said signal-producing means to correspond to a different message to be printed.

18. A postage meter of claim 17 wherein said means for producing signals comprises a memory and means for reading data stored in said memory to generate said signals.

19. In a method for printing postage indicia comprising deriving first signals corresponding to a postage value to be printed and printing said indicia in response to said first signals to have a first portion thereof corresponding to said value and a second portion corresponding to a message; the improvement comprising storing data corresponding to a message in an alterable memory, deriving second signals from said data, and printing said message in accordance with said second signals.

20. The method of claim 19 wherein said step of alterably storing data comprises storing said data in a memory, said method further comprising modifying said data in said memory in response to signals supplied to said postage meter from a source separate from said postage meter.

* * * * *